US008948520B2

(12) United States Patent
Sundaresan

(10) Patent No.: US 8,948,520 B2
(45) Date of Patent: *Feb. 3, 2015

(54) IMAGE CATEGORIZATION BASED ON COMPARISONS BETWEEN IMAGES

(71) Applicant: eBay Inc., San Jose, CA (US)

(72) Inventor: Neelakantan Sundaresan, Mountain View, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/225,313

(22) Filed: Mar. 25, 2014

(65) Prior Publication Data

US 2014/0205197 A1    Jul. 24, 2014

Related U.S. Application Data

(63) Continuation of application No. 13/532,274, filed on Jun. 25, 2012, now Pat. No. 8,750,625, which is a continuation of application No. 11/952,026, filed on Dec. 6, 2007, now Pat. No. 8,233,723.

(51) Int. Cl.
*G06K 9/68* (2006.01)
*G06K 9/62* (2006.01)
*G06F 17/30* (2006.01)

(52) U.S. Cl.
CPC ........ *G06K 9/6202* (2013.01); *G06F 17/30265* (2013.01); *G06K 9/6254* (2013.01)
USPC .......................................... 382/218; 382/224

(58) Field of Classification Search
USPC ........... 382/218–220, 224–228; 707/722–735
See application file for complete search history.

(56) References Cited

U.S. PATENT DOCUMENTS

| 4,910,593 | A | * | 3/1990 | Weil .............................. 348/164 |
| 5,479,252 | A | * | 12/1995 | Worster et al. ............. 356/237.5 |
| 5,684,999 | A | * | 11/1997 | Okamoto ......................... 704/9 |
| 5,839,013 | A | * | 11/1998 | Murasawa et al. ............... 399/15 |
| 6,434,264 | B1 | * | 8/2002 | Asar ............................. 382/147 |
| 6,999,614 | B1 | * | 2/2006 | Bakker et al. ................. 382/159 |
| 7,657,100 | B2 | * | 2/2010 | Gokturk et al. ............... 382/209 |
| 7,980,953 | B2 | * | 7/2011 | von Ahn Arellano .......... 463/42 |
| 8,233,723 | B2 | * | 7/2012 | Sundaresan ................... 382/218 |
| 8,750,625 | B2 | | 6/2014 | Sundaresan |
| 2002/0033695 | A1 | * | 3/2002 | Xiao ............................. 324/244 |
| 2002/0072162 | A1 | * | 6/2002 | Dor et al. ...................... 438/200 |
| 2002/0131641 | A1 | * | 9/2002 | Luo et al. ...................... 382/218 |
| 2005/0105806 | A1 | * | 5/2005 | Nagaoka et al. ............... 382/224 |
| 2008/0082426 | A1 | * | 4/2008 | Gokturk et al. .................. 705/27 |
| 2009/0137924 | A1 | * | 5/2009 | Kapoor et al. ................ 600/545 |
| 2009/0148052 | A1 | | 6/2009 | Sundaresan |
| 2010/0002932 | A1 | * | 1/2010 | Kasahara et al. ............. 382/149 |
| 2010/0166339 | A1 | * | 7/2010 | Gokturk et al. ............... 382/305 |

(Continued)

OTHER PUBLICATIONS

"U.S. Appl. No. 11/952,026 , Response filed Mar. 13, 2012 to Non Final Office Action mailed Dec. 13, 2011", 8 pgs.

(Continued)

*Primary Examiner* — Aaron W Carter
(74) *Attorney, Agent, or Firm* — Schwegman Lundberg & Woessner, P.A.

(57) ABSTRACT

In an example embodiment, a method is provided for image categorization. Here, images are displayed. In turn, a user input that describes a characteristic shared between the images from a comparison between the images is received. The user input may then be classified into categorization data.

18 Claims, 11 Drawing Sheets

(56) References Cited

U.S. PATENT DOCUMENTS

| | | | |
|---|---|---|---|
| 2010/0209591 A1* | 8/2010 | Eriksson et al. | 427/8 |
| 2010/0266196 A1* | 10/2010 | Kasahara et al. | 382/149 |
| 2012/0263387 A1 | 10/2012 | Sundaresan | |

OTHER PUBLICATIONS

"U.S. Appl. No. 11/952,026, Non Final Office Action Mailed Dec. 13, 2011", 11 pgs.

"U.S. Appl. No. 11/952,026, Notice of Allowance mailed Mar. 29, 2012", 8 pgs.

"U.S. Appl. No. 13/532,274, Non Final Office Action mailed Sep. 13, 2013", 9 pgs.

"U.S. Appl. No. 13/532,274, Notice of Allowance mailed Jan. 31, 2014", 7 pgs.

"U.S. Appl. No. 13/532,274, Response filed Jan. 13, 2014 to Non Final Office Action mailed Sep. 13, 2013", 7 pgs.

"U.S. Appl. No. 13/532,274, Supplemental Notice of Allowability mailed Feb. 19, 2014", 6 pgs.

"The ESP Game", [Online]. Retrieved from the Internet: <URL: http://www.espgame.org/Instructions.html>, (Accessed Nov. 13, 2007), 2 pgs.

Von Ahn, Luis, et al., "Labeling images with a computer game", Proceedings of the SIGCHI Conference on Human Factors in Computing Systems, (2004), 319-326.

* cited by examiner

IMAGE CATEGORIZATION BASED ON COMPARISONS BETWEEN IMAGES

CROSS-REFERENCE TO RELATED APPLICATIONS

This application is a continuation of U.S. patent application Ser. No. 13/532,274, filed Jun. 25, 2012, which is a continuation of U.S. patent application Ser. No. 11/952,026, filed Dec. 6, 2007, which application is incorporated herein by reference in its entirety.

FIELD

The present disclosure relates generally to categorizing data. In an example embodiment, the disclosure relates to image categorization based on comparisons between images.

BACKGROUND

Images are typically posted or attached with item listings to provide a visual representation of the item. For example, a seller may post an image as part of an item listing on an online auction. An online auction is a publicly held sale over a computer network at which users may bid on or purchase auction items. The item represented in the image needs to be accurately described such that the item and its associated image can be assigned to a category, which facilitates a search of the item by buyers.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

In the following description, for purposes of explanation, numerous specific details are set forth in order to provide a thorough understanding of an example embodiment of the present disclosure. It will be evident, however, to one skilled in the art that the present disclosure may be practiced without these specific details.

Example embodiments provide various techniques for categorizing an image based on comparisons between images. In an example, two or more images associated one or more items are displayed to a user. The user compares the images and provides an input that describes a difference or similarity between the images. The user input may then be classified into categorization data based on the difference or similarity. This categorization data may be used to assign or categorize the image (or items represented in the image) in a category. The images may be provided to a variety of different users in the form of a game. By playing the game, users are providing data that may be used to categorize the images.

Figure 1:
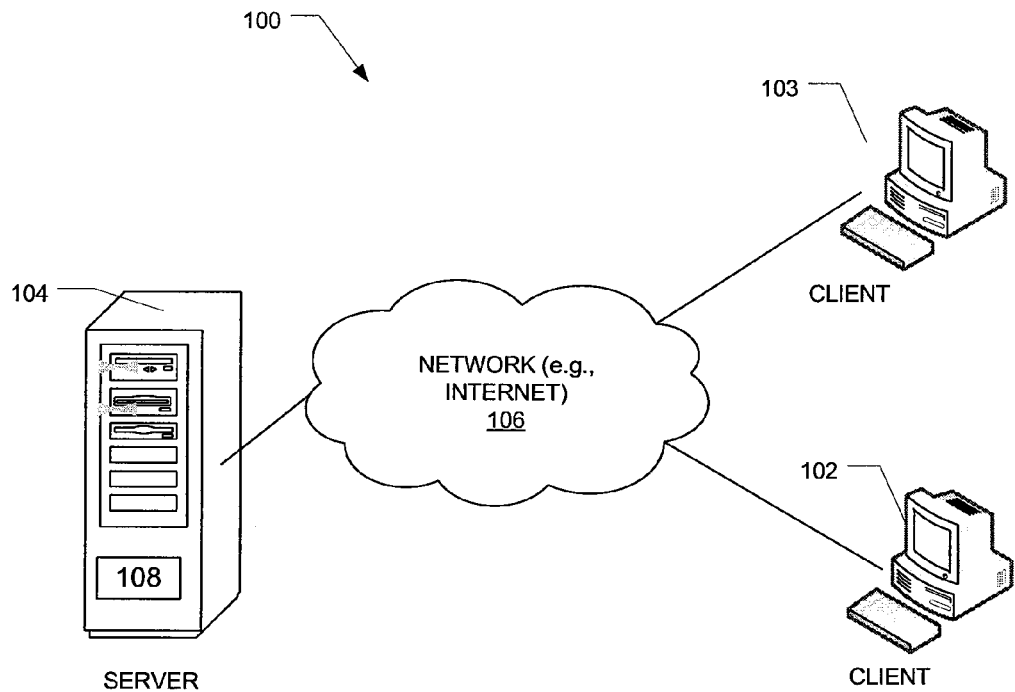
FIG. 1 is a diagram of an example embodiment of a networked system.

FIG. 1 is a diagram of an example embodiment of a networked system 100. Example system 100 includes various computing devices, such as client computing devices 102 and 103 and server 104, in communication by way of network 106, which may include one or more Local Area Networks (LANs) and/or Wide Area Networks (WANs), such as the Internet. Client computing devices 102 and 103 may access various services and functions supported by server 104. For example, server 104 may be an online auction server that handles transactions associated with electronic commerce. In general, an electronic commerce is the buying and selling of goods and services through digital communications. An online auction is an example of an electronic commerce. Briefly, an online auction is a publicly held sale over a computer network at which users may bid on or purchase auction items. Server 104 may host image categorization module 108 that, as explained in more detail below, is configured to derive categorization data based on comparisons made by one or more users.

It should be noted that while system 100 shown in FIG. 1 employs a client-server architecture, the present disclosure is not limited to such an architecture. For example, client computing devices 102 and 103 also may host image categorization module 108. In addition, image categorization module 108 could equally well find application in a distributed or peer-to-peer architecture system.

Figure 2:
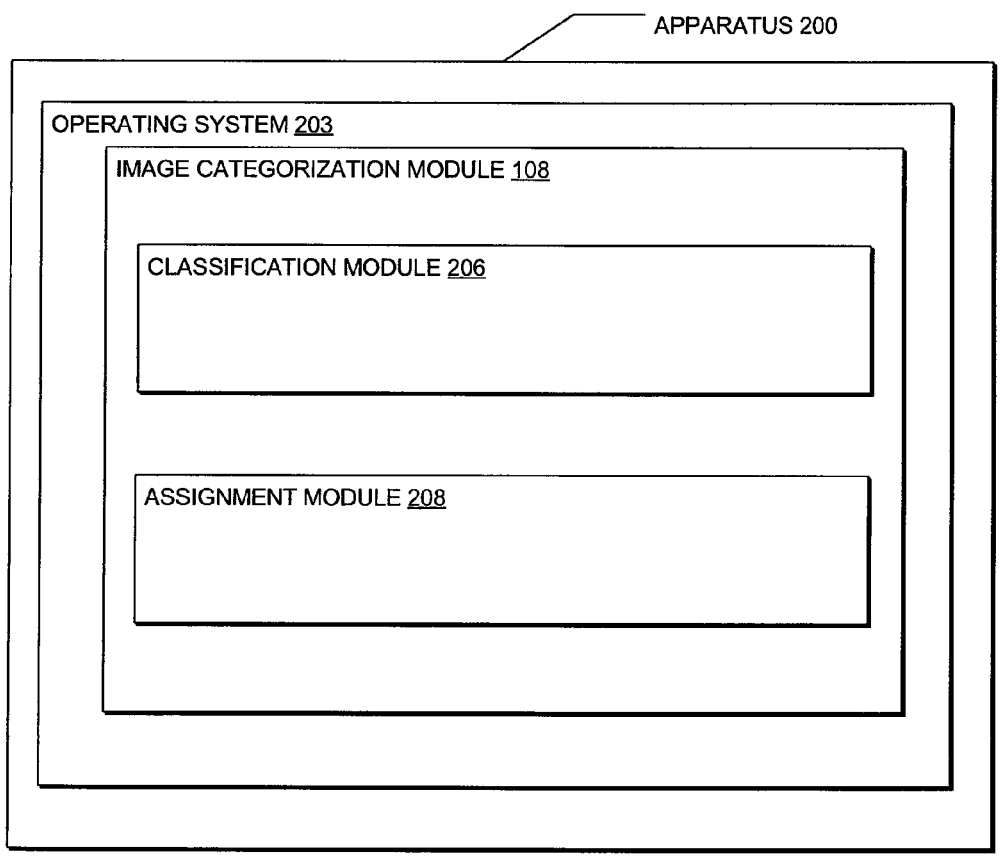
FIG. 2 is a simplified block diagram of image categorization module included in apparatus, in accordance with an example embodiment.

FIG. 2 is a simplified block diagram of image categorization module 108 included in apparatus 200, in accordance with an example embodiment. Example of apparatus 200 may include a variety of computing devices, such as server 104 depicted in FIG. 1. Returning to FIG. 2, in various embodiments, apparatus 200 may be used to implement computer programs, logic, applications, methods, processes, or other software to categorize images, as described in more detail below.

Apparatus 200 includes operating system 203 that manages the software processes and/or services executing on the apparatus. As shown in FIG. 2, these software processes and/or services may include image categorization module 108. Image categorization module 108 may further include classification module 206 and assignment module 208. In general, image categorization module 108 is configured to display two or more images and to receive one or more user inputs associated with the images. As explained in more detail below, classification module 206 then classifies the user input into categorization data. In an example embodiment, assignment module 208 may then assign the images to one or more categories based on the categorization data.

It should be appreciated that in other example embodiments, apparatus 200 may include fewer or more modules apart from those shown in FIG. 2. For example, image categorization module 108 may be integrated with classification module 206 to form one module. In another example, assignment module 208 may be excluded from image categorization module 108.

Figure 3:
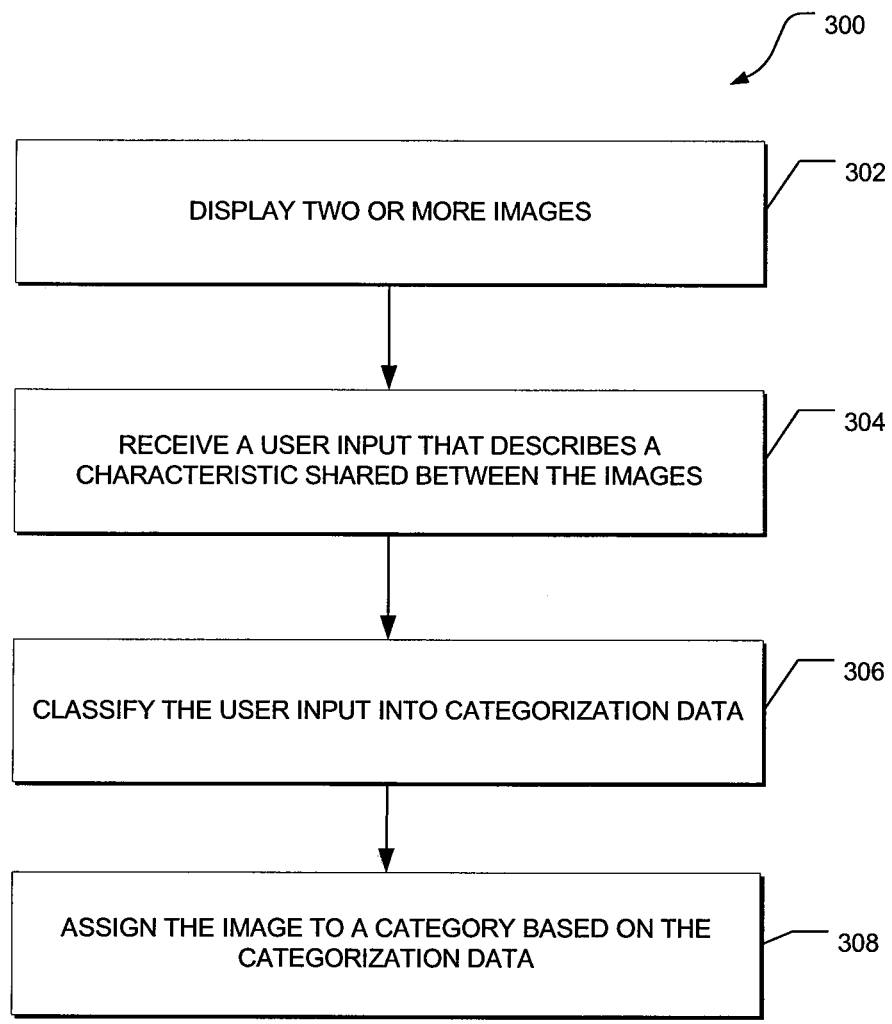
FIG. 3 is a flow diagram of a general overview of method, in accordance with an example embodiment, for image categorization.

FIG. 3 is a flow diagram of a general overview of method 300, in accordance with an example embodiment, for image categorization, In an example embodiment, method 300 may be implemented by image categorization module 108 of FIG. 2, employed in an apparatus, such as server 104 shown FIG. 1. As shown in FIG. 3, two or more images are displayed or rendered at 302, In an example embodiment, the images are displayed together. For example, the images are displayed side by side or next to each other. In another example embodiment, the images are displayed separately. For example, the images are displayed one at a time in sequence. The images are displayed to one or more users. In view of the images, a user provides an input (or user input) that describes a characteristic shared between the images from a comparison between the images. It should be noted that a user makes the comparison. As explained in more detail below, in an example embodiment, the characteristic shared may be a difference between the images. In another example embodiment, the characteristic may be a similarity between the images. The user input may include a variety of data that describes one or more characteristics shared between images from a comparison between the images. Examples of user input may include words, sentences, alphanumeric characters, and other data.

The user input is received at 304 and the user input may be classified into categorization data at 306. In general, categorization data is data that may be used to assign an image into one or more categories. Examples of categorization data include attribute names and values associated with the attribute names. In an example embodiment, the user input may be classified into one or more attribute names associated with one or more items represented in the image based on the characteristic. In another example embodiment, the user input may be classified into one or more values associated with an attribute name based on the characteristic. It should be appreciated that items may include goods, services, properties, and other items. Examples of goods include electronic devices, toys, cars, compact disks, and other goods. Services may include, for example, gardening services, jobs, and other services. An attribute name describes an attribute of an item represented in an image. Examples of attribute names include "color," "computer," "book," "shape," "toy," "music," "television," "radio," "music players," and other attribute names. A value associated with an attribute name may further define the attribute. For example, a value of "blue," "green," or "red" may be associated with the attribute name of "color." In another example, a value of "rectangle," "square," or "circle" may be associated with the attribute name of "shape," in still another example, a value of "30 gigabytes," "20 gigabytes," or "10 gigabytes" may be associated with the attribute name of "memory." It should be further noted, in accordance with yet another embodiment, the user input may be classified into one or more attribute name-value pairs that include both the attribute name and the value associated with the attribute name, such as the attribute name of "color" paired with value of "green." Accordingly, in example embodiments, the categorization data may include attribute name and/or value associated with the attribute name.

In an example embodiment, the image (or the items represented in the image) can further be assigned into a category at 308 based on the categorization data. In an example embodiment, the categorization data may be used in electronic commerce, such as an online auction, to categorize items. Users may place and search for items within categories. An example of a category is "clothing and accessories," Other examples of categories include "computers and office equipment," "motor vehicles," "toys," and other categories. The categories may be accessible in the form of a category listing tree, including sub-categories. To further the example, sub-categories for the "computers and office equipment" category may include "laptop computers" and "desktop computers." Sub-categories for laptop computers may include "14" screen or smaller" and "15" screen or larger."

Figure 4:
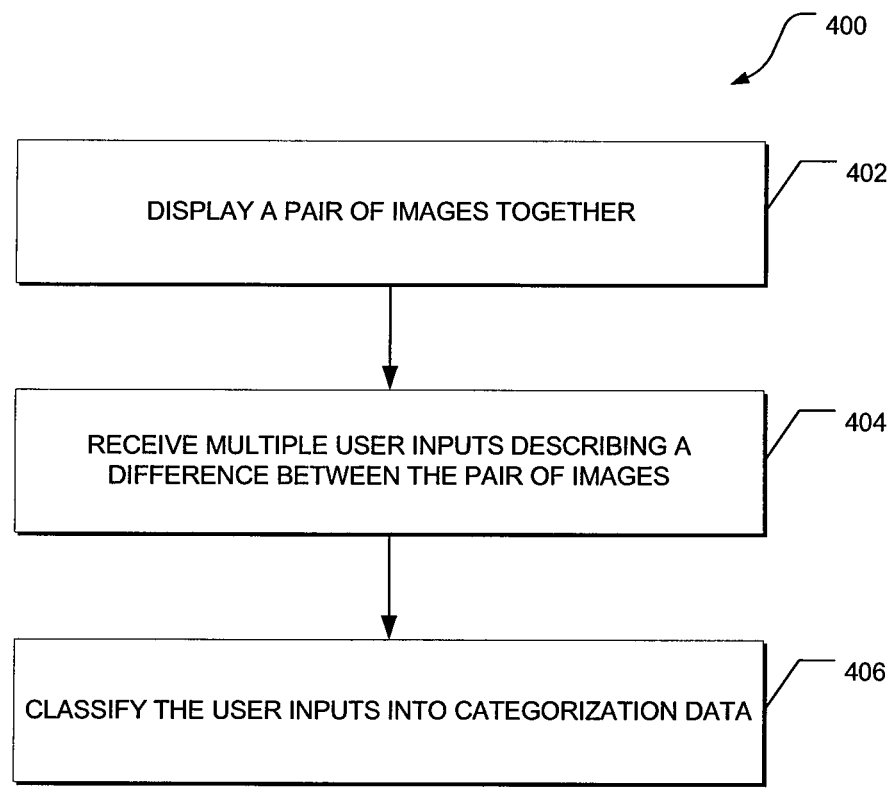
FIG. 4 is a flow diagram of a detailed method, in accordance with an example embodiment, for classifying user inputs into categorization data based on a difference between images.

FIG. 4 is a flow diagram of a detailed method 400, in accordance with an example embodiment, for classifying user inputs into categorization data based on a difference between images. Starting at 402, a pair of images is displayed together or side by side. An instruction to the user may also be displayed asking the user to identify one or more differences between the pair of images. For example, the user may be asked to identify dissimilar features of one or more items rendered in the images. Here, the pair of images may be displayed to multiple users. In view of the pair of images, each user may provide inputs describing one or more differences between the pair of images.

In turn, the user inputs describing the differences between the pair of images are received from different users at 404. User inputs may then be classified into categorization data at 406 based on the difference between the pair of images. The difference may include a variety of objects represented in the images. For example, a difference may include a difference in color of an item represented in the images. Another difference may include, for example, a difference in the type of item represented in the images. As discussed above, the user inputs may be classified into one or more attribute names and/or one or more values associated with the attribute names. In an example embodiment, a weight may be assigned to each user input and the classification of the user input may further be based on the assigned weight. The weight is a measure of the relative importance of a user input in a statistical population of user inputs. For example, a weight may be assigned to a user based on a user rating associated with the user. The rating may represent a reputation of the user and may be based on feedback left by other users. Examples of user ratings include numerical scores, rankings, comments (e.g., positive, neutral, negative), and other ratings. The weight may correlate to a user rating. For example, a user with a high rating may be assigned a higher weight than another user with a low rating.

Figure 5A:
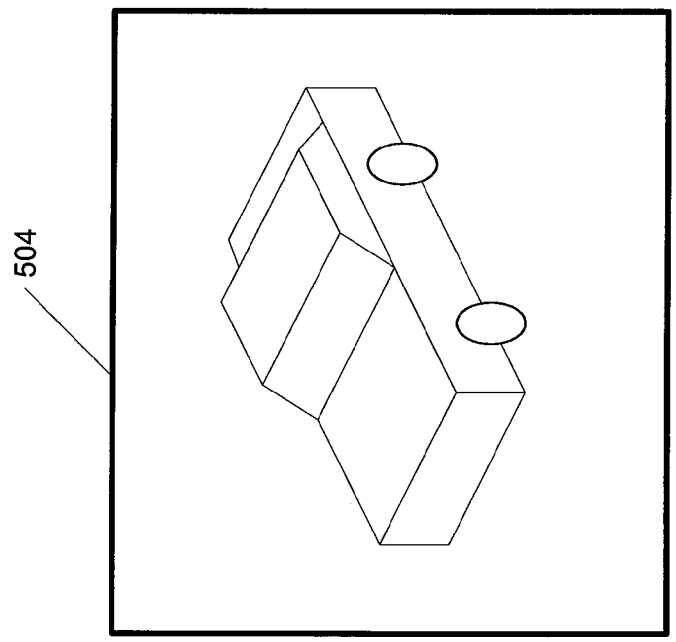
FIGS. 5a-5c are diagrams, in accordance with an example embodiment, illustrating the classification of user input into categorization data from a pair of images based on differences between the images.
Figure 5A:
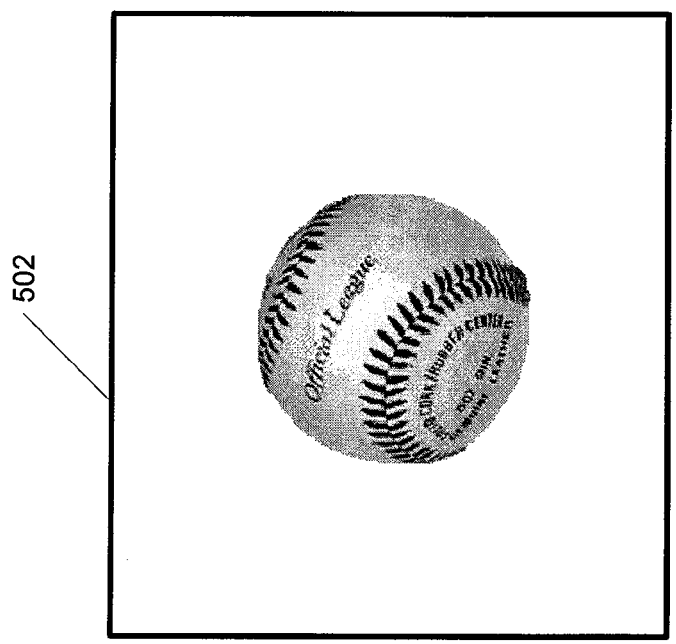
Figure 5B:
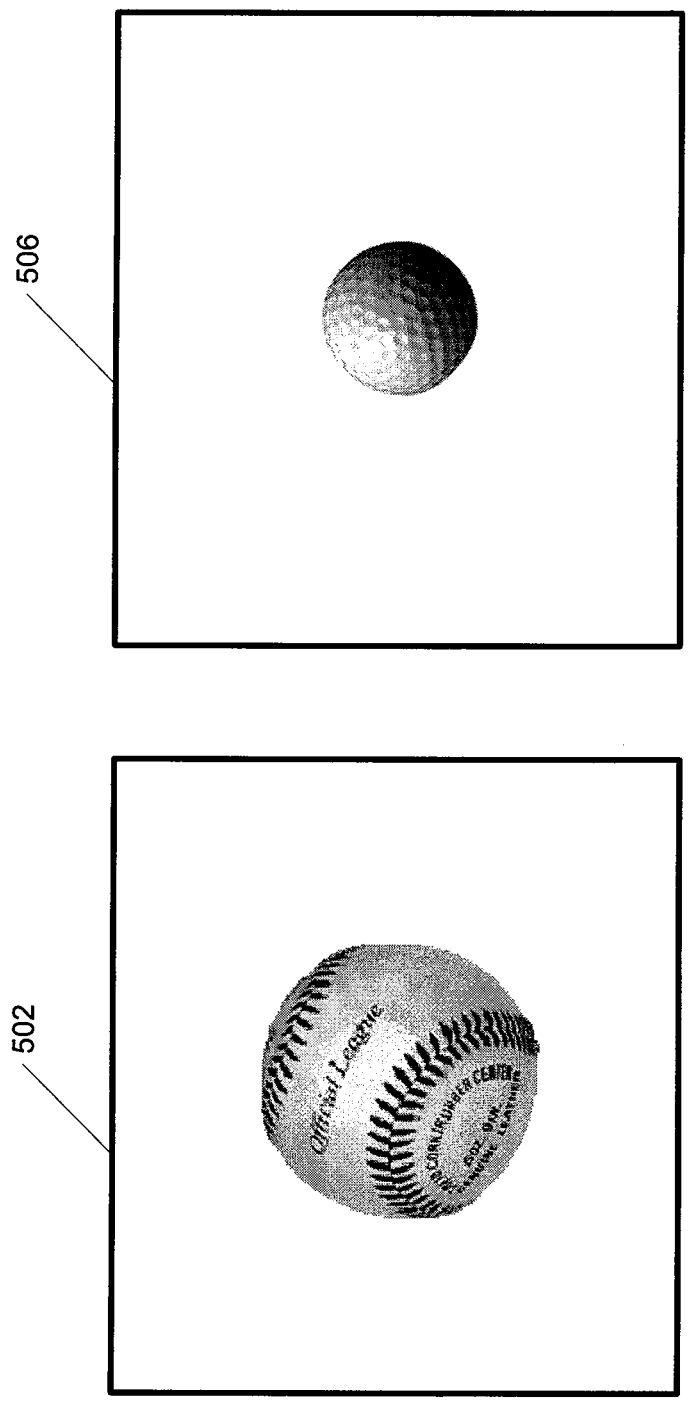
Figure 5C:
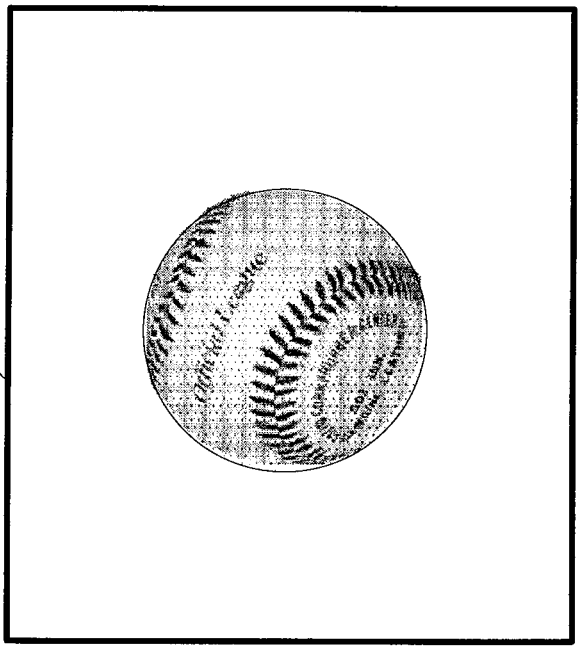
Figure 5C:
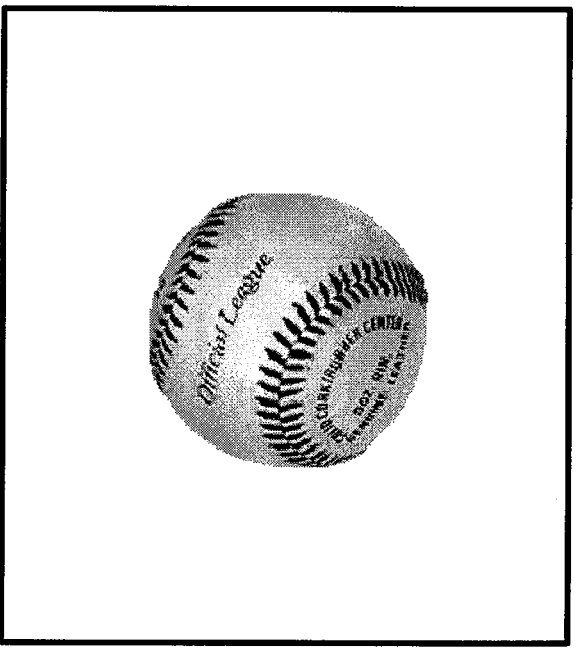

FIGS. 5a-5c are diagrams, in accordance with an example embodiment, illustrating the classification of user input into categorization data from a pair of images based on differences between the images. FIG. 5a illustrates a pair of images 502 and 504 displayed side by side. A baseball is represented in image 502 while an automobile is represented in image 504. Here, a user may have posted image 502 as part of a listing on an online auction. The category associated image 502 may be derived by a comparison of the image with one or more other images, such as image 504.

In this example, an instruction is provided (not shown) asking a user to identify one or more differences between image 502 and image 504 and provide an input describing the differences. Here, the user makes a comparison of image 502 with image 504 and inputs "left image is a ball" as a difference between the images. The user input may then be classified into categorization data. In an example, the user input can be classified as an attribute name of "ball" that is associated with image 502.

With the attribute name of "ball" derived, further enquiries may be made to determine the type of ball represented in image 502. For example, various types of images associated with different balls may be displayed until a match is found.

As shown in FIG. 5b, another pair of images 502 and 506 may be displayed to further derive the value associated with the attribute name of "ball." The same baseball is represented in image 502 while a golf ball is represented in image 506. Again, the same instruction is provided asking the user to identify one or more differences between images 502 and 506. In view of images 502 and 506, the user makes a comparison of image 502 with image 503 and inputs, for example, "right image is a golf ball". Here, no match is found because there is a difference between image 502 and image 506. As such, another enquiry may be made to determine the value associated the attribute name of "ball."

As shown in FIG. 5c, another pair of images 502 and 502' may be displayed with the same instruction to identify one or more differences between images 502 and 502'. Here, a baseball is represented in both images 502 and 502'. in view of images 502 and 502', the user makes a comparison of image 502 and image 502' and inputs, for example, "no difference." A match is found because the user indicates that both images 502 and 502' are similar. With the knowledge that a "baseball" is represented in image 502', a value of "baseball" may be associated with the attribute name of "ball."

It should be appreciated that, in addition to type of ball, a variety of other categorization data may be derived from a comparison between the pair of images referred above. For example, categorization data may also include the type of color. Returning to FIG. 5c, the baseball represented in image 502 has a color of white. On the other hand, the baseball represented in image 502' has a color of red. Again, the same instruction is provided asking the user to identify one or more differences between images 502 and 502'. In view of images 502. and 502', the user makes a comparison of image 502 with image 502' and inputs, for example, "color." Here, the user input may be classified as an attribute name of "color." With the attribute name of "color" derived, further enquiries may be made to determine the type of color represented in images 502 and 502'. For example, another instruction may be provided asking the user to further identify another difference between images 502 and 502'. The user makes another comparison of image 502 with image 502' and inputs, for example, "left is white," A value of "white" may therefore be associated with the attribute name of "color" for image 502. Alternatively, the user may input, for example, "right is red." A value of "red" may therefore be associated with the attribute name of "color" for image 502'.

Figure 6:
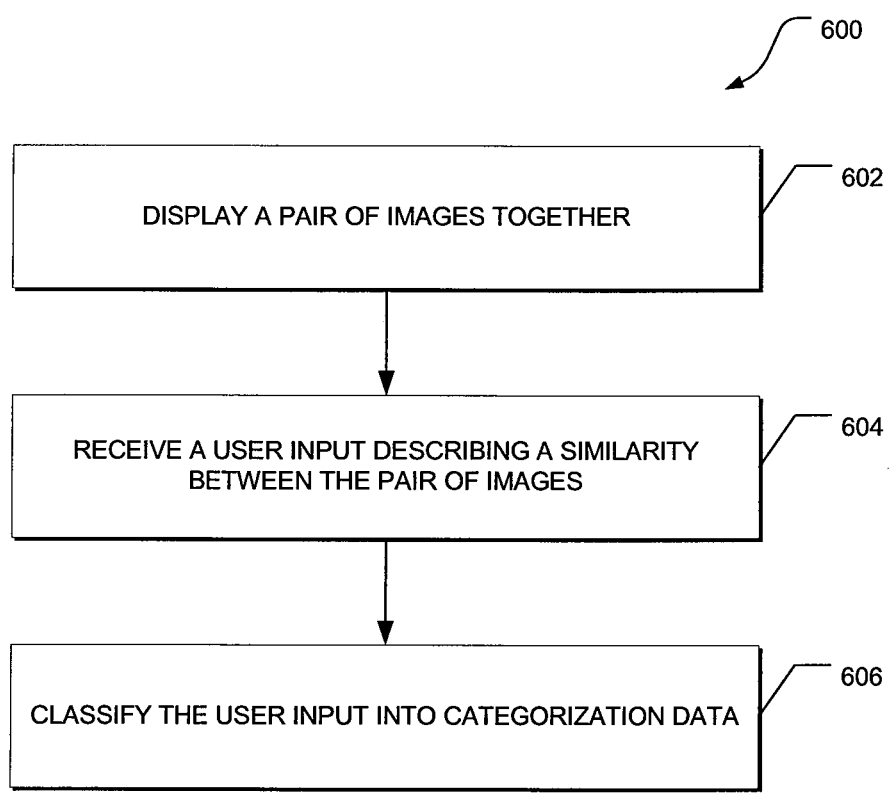
FIG. 6 is a flow diagram of a detailed method, in accordance with an example embodiment, for classifying user inputs into categorization data based on similarities between the images.

FIG. 6 is a flow diagram of a detailed method 600, in accordance with an example embodiment, for classifying user inputs into categorization data based on similarities between the images. Starting at 602, a pair of images is displayed together or side by side. An instruction to the user may also be displayed asking the user to identify one or more similarities between the pair of images. For example, the user may be asked to identify identical features of one or more items rendered in the images. Similarly, the pair of images may be displayed to multiple users, In view of the pair of images, each user may provide inputs defining one or more similarities between the pair of images.

In turn, the user inputs describing the differences between the pair of images are received from different users at 604. The user inputs then may be classified into categorization data at 606 based on the similarity between the pair of images. As discussed above, the user inputs may be classified into one or more attribute names and/or one or more values associated with the attribute names. Again, in an example embodiment, a weight may be assigned to each user input and the classification of the user inputs into categorization data may further be based on the assigned weight.

Figure 7A:
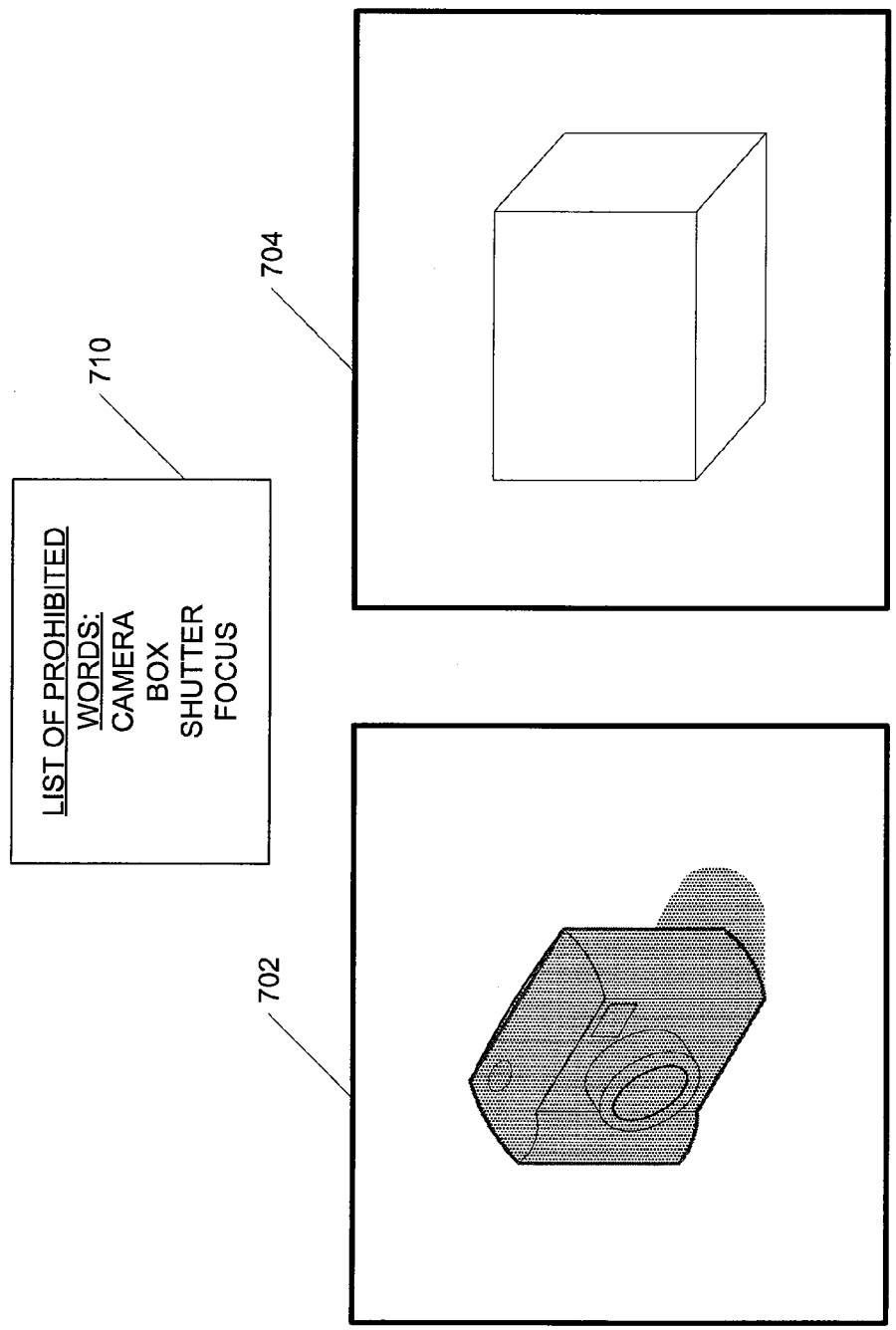
FIGS. 7a-7b are diagrams, in accordance with an example embodiment, illustrating the classification of user input into categorization data from a pair of images based on differences and/or similarities.
Figure 7B:
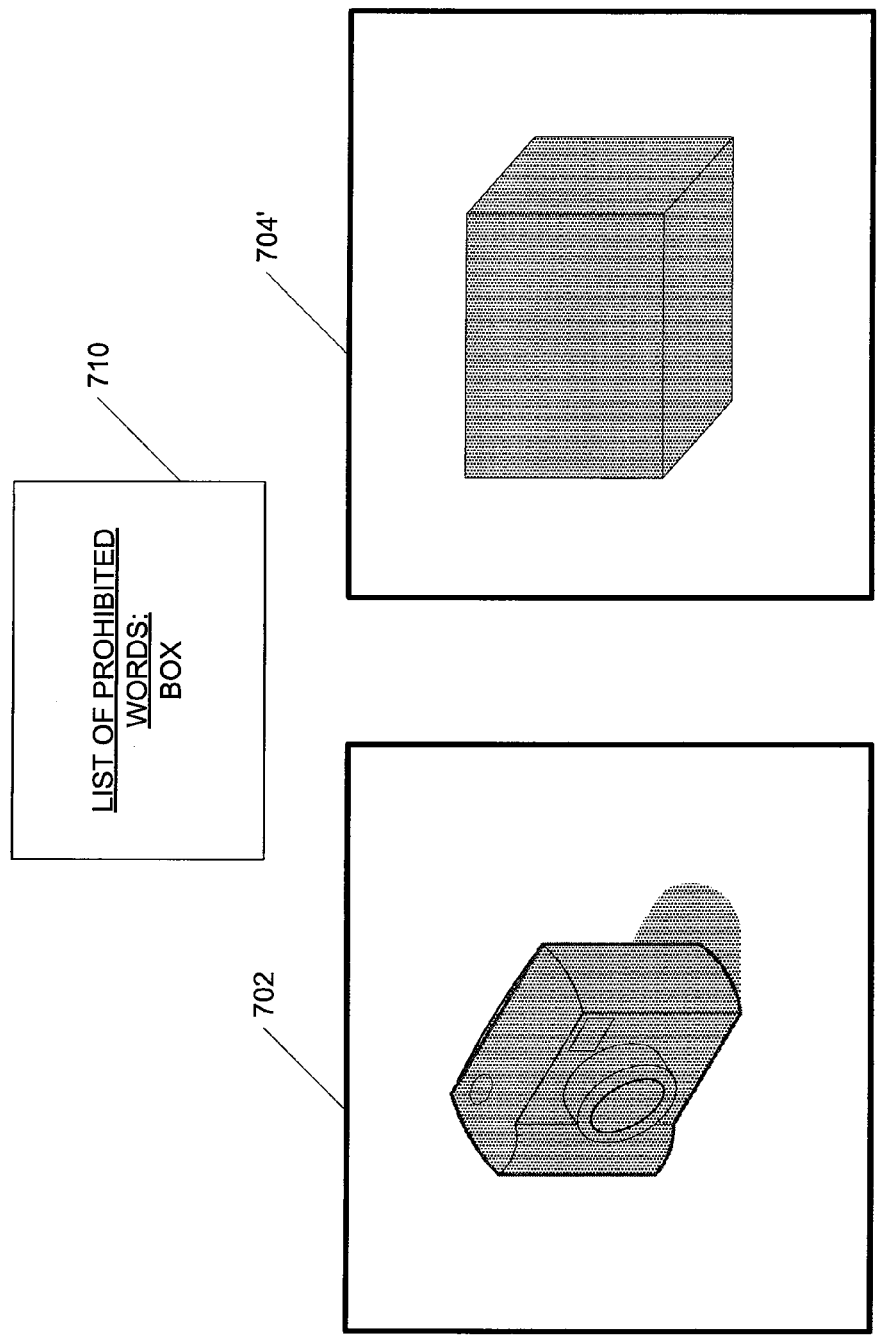

FIGS. 7a-7b are diagrams, in accordance with an example embodiment, illustrating the classification of user input into categorization data from a pair of images based on differences and/or similarities. FIG. 7a illustrates a pair of images 702 and 704 displayed side by side. A camera is represented in image 702 while a box is represented in image 704. In addition to images 702 and 704, a list 710 of prohibited categorization data is also displayed with the images, in accordance with an example embodiment. The list 710 may define a list of words, sentences, or other categorization data that a user may not enter as input. As such, a user provides inputs that are distinct from list 710 of prohibited categorization data. The prohibited categorization data listed in list 710 can be associated with images 702 and 704. The categorization data may, for example, include previous user inputs associated with images 702 and 704 and list 710 may be used to extract more categorization data. In another example embodiment, a user may select words or other categorization data from a list of categorization data (not shown) that can also be displayed with images 702 and 704. Here, the user input is selected from the list of categorization data. For example, the user may only select words from the list of categorization data as input. Again, such a list may also be used to extract more categorization data.

The category associated image 702 may be derived by a comparison of the image with one or more other images, such as image 704. In this example, an instruction is provided (not shown) asking a user to identify one or more differences between image 702 and image 704 and provide an input describing the differences. The user makes a comparison of image 702 with image 704 and knows that words (e.g., "camera," "shutter," "box," and other categorization data) from list 710 of prohibited categorization data are prohibited. As such, the user inputs "color" as a difference between the images because camera represented in image 702 has a different color than box represented in image 704. In an example, the user input can be classified as an attribute name of "color" that is associated with image 702.

With the attribute name of "color" derived, further enquiries may be made to determine the type of color represented in image 702. For example, various types of images associated with different colors may be displayed until a match is found. As shown in FIG. 7b, another pair of images 702 and 704 may be displayed to further derive the value associated with the attribute name of "color." The same camera is represented in image 702 while a green box is represented in image 704'. In this example, an instruction is provided (not shown) asking the user to identify one or more similarities between images 702 and 704'. As shown in list of prohibited words 710, the word "color" is prohibited. The user makes a comparison of image 702 with image 704' and inputs, for example, "green" as a similarity. A match is found because both images 702 and 704' (or items) share the same color. As such, a value of "green" may be associated with the attribute name of "color."

Figure 8:
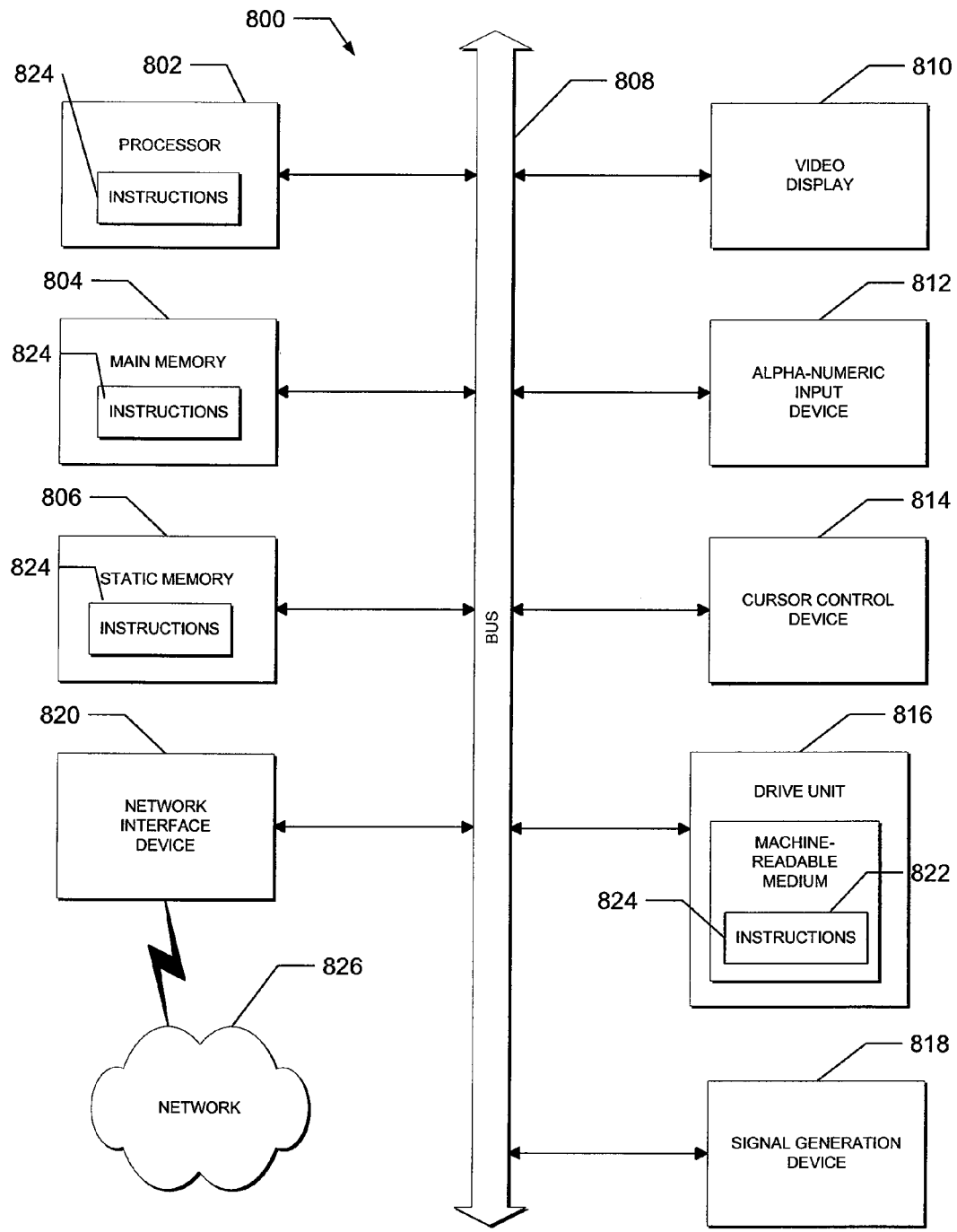
FIG. 8 is a simplified block diagram of a machine in the example form of a computing system within which a set of instructions, for causing the machine to perform any one or more of the methodologies discussed herein, may be executed.

FIG. 8 is a simplified block diagram of a machine in the example form of a computing system within which a set of instructions, for causing the machine to perform any one or more of the methodologies discussed herein, may be executed. In alternative embodiments, the machine may be connected e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance or any machine capable of executing a set of instructions (sequential or otherwise) that specify actions to be taken by that machine. Further, while only a single machine is illustrated, the term "machine" shall also be taken to include any collection of machines that individually or jointly execute a set or multiple sets) of instructions to perform any one or more of the methodologies discussed herein.

Example computing system 800 includes processor 802 (e.g., a central processing unit (CPU), a graphics processing unit (GPU) or both), main memory 804 and static memory 806, which communicate with each other via bus 808. Computing system 800 may further include video display unit 810 (e.g., a plasma display, a liquid crystal display (LCD) or a cathode ray tube (CRT)). Computing system 800 also includes alphanumeric input device 812 (e.g., a keyboard), user interface (UI) navigation device 814 (e.g., a mouse), disk drive unit 816, signal generation device 818 (e.g., a speaker) and network interface device 820.

Disk drive unit 816 includes machine-readable medium 822 on which is stored one or more sets of instructions and data structures (e.g., software 824) embodying or utilized by any one or more of the methodologies or functions described herein. Software 824 may also reside, completely or at least partially, within main memory 804 and/or within processor 802 during execution thereof by computing system 800, with main memory 804 and processor 802 also constituting machine-readable, tangible media. Software 824 may further be transmitted or received over network 826 via network interface device 820 utilizing any one of a number of well-known transfer protocols (e.g., Hypertext Transfer Protocol (HTTP)).

While machine-readable medium 822 is shown in an example embodiment to be a single medium, the term "machine-readable medium" should be taken to include a single medium or multiple media (e.g., a centralized or distributed database, and/or associated caches) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method for image categorization comprising:
    displaying a first image and a second image, including displaying a list of prohibited categorization data;
    receiving, from a user device, a description generated by a user and based on a comparison between the first image and the second image, the description being distinct from the list of prohibited categorization data;
    classifying the description into categorization data identifying one or more categories; and
    based on the categorization data, assigning the first image to a category.

2. The method of claim 1, wherein the description describes a characteristic shared between the first image and the second image based on the comparison.

3. The method of claim 2, wherein the characteristic shared is a difference between the first image and the second image.

4. The method of claim 2, wherein the characteristic shared is a similarity between the first image and the second image.

5. The method of claim 1, wherein the categorization data is an attribute name associated with an item represented in the first image.

6. The method of claim 1, wherein displaying the first image and the second image includes displaying a list of categorization data, the description being based on the list of categorization data.

7. A non-transitory machine-readable storage medium comprising instructions, which when implemented by one or more processors perform the following operations:
    displaying a first image and a second image, including displaying a list of prohibited categorization data;
    receiving, from a user device, a description generated by a user and based on a comparison between the first image and the second image, the description being distinct from the list of prohibited categorization data;
    classifying the description into categorization data identifying one or more categories; and
    based on the categorization data, assigning the first image to a category.

8. The non-transitory machine-readable storage medium of claim 7, wherein the description describes a characteristic shared between the first image and the second image based on the comparison.

9. The non-transitory machine-readable storage medium of claim 8, Wherein the characteristic shared is a difference between the first image and the second image.

10. The non-transitory machine-readable storage medium of claim 8, wherein the characteristic shared is a similarity between the first image and the second image.

11. The non-transitory machine-readable storage medium of claim 7, wherein the categorization data is an attribute name associated with an item represented in the first image.

12. The non-transitory machine-readable storage medium of claim 7, wherein displaying the first image and the second image includes displaying a list of categorization data, the description being based on the list of categorization data.

13. An apparatus comprising:
    a memory configured to store an image categorization module; and
    a processor in communication with the memory, the processor being configured to execute the image categorization module, the image categorization module configured to:

display a first image and a second image, including display a list of prohibited categorization data;

receive, from a user device, a description generated by a user and based on a comparison between the first image and the second image, the description being distinct from the list of prohibited categorization data;

classify the description into categorization data identifying one or more categories; and based on the categorization data, assign the first image to a category.

14. The apparatus of claim 13, wherein the description describes a characteristic shared between the first image and the second image based on the comparison.

15. The apparatus of claim 14, wherein the characteristic shared is a difference between the first image and the second image.

16. The apparatus of claim 14, wherein the characteristic shared is a similarity between the first image and the second image.

17. The apparatus of claim 13, wherein the categorization data is an attribute name associated with an item represented in the first image.

18. The apparatus of claim 13, wherein displaying the first image and the second image includes displaying a list of categorization data, the description being based on the list of categorization data.

* * * * *